US008082580B1

(12) United States Patent
Desai et al.

(10) Patent No.: US 8,082,580 B1
(45) Date of Patent: Dec. 20, 2011

(54) SESSION LAYER PINHOLE MANAGEMENT WITHIN A NETWORK SECURITY DEVICE

(75) Inventors: Purvi Desai, Cupertino, CA (US); Anil Bollineni, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 890 days.

(21) Appl. No.: 12/102,138

(22) Filed: Apr. 14, 2008

Related U.S. Application Data

(60) Provisional application No. 61/016,275, filed on Dec. 21, 2007.

(51) Int. Cl.
*G06F 7/04* (2006.01)
*G06F 15/16* (2006.01)
*G06F 17/30* (2006.01)
*G06F 9/00* (2006.01)
*G06F 17/00* (2006.01)
*G06F 15/173* (2006.01)
*H04L 29/06* (2006.01)
*H04L 9/32* (2006.01)

(52) U.S. Cl. ............... 726/14; 726/3; 726/12; 709/224; 709/226; 709/228; 709/229; 713/168

(58) Field of Classification Search ............... 726/14
See application file for complete search history.

(56) References Cited

U.S. PATENT DOCUMENTS

| | | | |
|---|---|---|---|
| 6,865,681 B2* | 3/2005 | Nuutinen | 726/14 |
| 7,185,094 B2* | 2/2007 | Marquette et al. | 709/225 |
| 7,254,832 B1* | 8/2007 | Christie, IV | 726/11 |
| 7,340,771 B2* | 3/2008 | Chan et al. | 726/12 |
| 7,529,354 B2* | 5/2009 | Kiss et al. | 379/93.01 |
| 7,561,575 B2* | 7/2009 | Biswas et al. | 370/392 |
| 7,738,469 B1* | 6/2010 | Shekokar et al. | 370/401 |
| 7,751,536 B1* | 7/2010 | Abramson et al. | 379/88.17 |
| 7,764,699 B2* | 7/2010 | Jennings et al. | 370/401 |

(Continued)

FOREIGN PATENT DOCUMENTS

WO    WO 2005043814 A1 *   5/2005

OTHER PUBLICATIONS

Office Action for U.S. Appl. No. 12/108,884 dated Jun. 28, 2010, 21 pp.

(Continued)

*Primary Examiner* — Christopher Revak
*Assistant Examiner* — Carolyn B Kosowski
(74) *Attorney, Agent, or Firm* — Shumaker & Sieffert, P.A.

(57) ABSTRACT

In general, techniques are described for performing session layer pinhole management within a network security device. In accordance with the techniques, the network device includes a resource manager module and a Session Initiation Protocol (SIP) module. The SIP module receives a SIP message from a private server, the SIP message requesting a SIP session. In response to the SIP message, the SIP module via the resource manager module opens a pinhole to permit the SIP session and assigns via the resource manager module resources included within the resource pool to monitor each call occurring over the SIP session. The SIP module further determines whether each of the calls has completed based on an session layer characteristic of a subsequent SIP message associated with each call and based on the determination, returns via the resource manager module the resources assigned to monitor each completed call to the resource pool.

24 Claims, 5 Drawing Sheets

U.S. PATENT DOCUMENTS

| | | | |
|---|---|---|---|
| 7,765,294 B2 * | 7/2010 | Edwards et al. | 709/224 |
| 2002/0131575 A1 * | 9/2002 | Gallant | 379/220.01 |
| 2003/0110257 A1 | 6/2003 | Hyun et al. | |
| 2006/0023657 A1 | 2/2006 | Woodson et al. | |
| 2006/0075483 A1 * | 4/2006 | Oberle et al. | 726/14 |
| 2006/0146792 A1 * | 7/2006 | Ramachandran et al. | 370/352 |
| 2006/0218624 A1 * | 9/2006 | Ravikumar et al. | 726/3 |
| 2006/0235980 A1 | 10/2006 | Pote et al. | |
| 2006/0239255 A1 * | 10/2006 | Ramachandran et al. | 370/352 |
| 2006/0242300 A1 | 10/2006 | Yumoto et al. | |
| 2006/0291480 A1 | 12/2006 | Cho et al. | |
| 2007/0121673 A1 * | 5/2007 | Hammer | 370/468 |
| 2007/0124813 A1 * | 5/2007 | Ormazabal et al. | 726/11 |
| 2007/0201473 A1 * | 8/2007 | Bhatia et al. | 370/392 |
| 2007/0209067 A1 * | 9/2007 | Fogel | 726/11 |
| 2008/0037517 A1 * | 2/2008 | Emborg | 370/352 |
| 2008/0052401 A1 * | 2/2008 | Bugenhagen et al. | 709/227 |
| 2008/0052556 A1 | 2/2008 | Donovan et al. | |
| 2008/0270618 A1 * | 10/2008 | Rosenberg | 709/228 |
| 2009/0205039 A1 * | 8/2009 | Ormazabal et al. | 726/11 |
| 2010/0131621 A1 * | 5/2010 | Zetterlund et al. | 709/221 |
| 2010/0220718 A1 * | 9/2010 | Hoffmann | 370/352 |
| 2011/0010752 A1 * | 1/2011 | Hunyady et al. | 726/1 |
| 2011/0138456 A1 * | 6/2011 | Ormazabal et al. | 726/11 |

OTHER PUBLICATIONS

Response to Office Action for U.S. Appl. No. 12/108,884 dated Sep. 28, 2010, 19 pp.

Office Action for U.S. Appl. No. 12/108,884 dated Nov. 30, 2009, 21 pgs.

Response to Office Action for U.S. Appl. No. 12/108,884 dated Mar. 1, 2010, 16 pgs.

U.S. Appl. No. 12/108,884, filed Apr. 24, 2008, entitled "Managing Voice-Based Data Communications Within a Clustered Network Environment."

D. Richard Kuhn et al., "Security Considerations for Voice Over IP Systems," National Institute of Standards and Technology, NIST Special Publication 800-58, Jan. 2005, 99 pages.

\* cited by examiner

SESSION LAYER PINHOLE MANAGEMENT WITHIN A NETWORK SECURITY DEVICE

This application claims the benefit of U.S. Provisional Application No. 61/016,275, filed Dec. 21, 2007, the entire contents of which is incorporated herein by reference.

TECHNICAL FIELD

The invention relates to computer networks and, more particularly, to managing network access within the computer network.

BACKGROUND

Voice over Internet Protocol, or VoIP, is an emerging service by which a telephone or voice call can be routed over a packet switched network, such as the Internet. Many protocols have been developed to facilitate VoIP, one such protocol being a Session Initiation Protocol (SIP). SIP generally works in concert with several other protocols and mainly provides for the call set-up and signaling portion of a VoIP call. That is, SIP is responsible for setting up and tearing down a session over which the VoIP call occurs, not for the actual transmission of call data over the session. Other protocols, such as Session Description Protocol (SDP) and the Real-time Transport Protocol (RTP), are typically employed for describing, packaging and transmitting the call data.

Typically, SIP-enabled telephony networks include a number of SIP clients or devices coupled to a SIP proxy server. One feature offered by the proxy server enables a SIP device to register its current location, e.g., an IP address and port currently assigned to the SIP device, so that the proxy server can properly forward any SIP packets designated for the SIP device to that registered location. This registration feature, therefore, enables SIP devices, such as a SIP-enabled cellular phone, to roam among various IP networks and still receive VoIP calls. Frequently, two SIP proxy servers couple to one another and form what may be referred to as a "SIP trunk." Often SIP trunks arise when one proxy server resides within a private network, such as an enterprise network, and the other proxy server resides within a public network, such as the Internet.

The private network may insert a firewall or other network security device between the two proxy servers to secure the private network from attacks originating within the public network. The firewall ensures security by blocking all but a select few IP address/port pairs. The chosen IP addresses/port pairs can be seen as small, restrictive holes, which are commonly referred to as "pinholes." Typically, each pinhole defines a public IP address/port pair and a private IP address/port pair. The public IP address/port pair indicates an IP address/port pair assigned to a device that resides in the public network from which the firewall accepts traffic. The private IP address/port pair indicates an IP address/port assigned to a device that resides in the private network to which the firewall permits traffic to flow. To enable SIP communications occurring over the SIP trunk to flow between the public and private networks, the firewall therefore opens at least one pinhole.

However, these pinholes are often coarsely defined because only the proxy servers know the IP address/port pairs, i.e., location, of the SIP devices to which the proxies couple. That is, the public proxy server knows the locations of the public SIP devices but not the private SIP devices and vice versa. Thus, the firewall cannot adequately define the public address/port pairs of the pinhole and must set this pair to allow any IP address and any port. This may create substantial security risks, as any public device may now access the private network through the broad pinhole. Further, because the private proxy server initiates all SIP requests for a new VoIP call for devices in the private network, the private IP address/port pair of the pinhole is set to the IP address/port pair of the initiating proxy server. Upon receiving subsequent SIP requests from the private proxy server, the firewall may return the same pinhole previously opened for use by the proxy server. Two or more calls may therefore proceed through the firewall via the same pinhole without being distinguished as separate traffic flows. Indistinguishable flows may lead to poor use of firewall resources as some of these resources may be needlessly allocated to flows of calls that are complete but cannot be distinguished as complete because the separate call flows are viewed as one by the firewall.

SUMMARY

In general, techniques are described for precise pinhole management within a network security device. In particular, the techniques enable a network security device, such as a firewall, to more precisely identify and distinguish between call flows occurring over a SIP session by actively monitoring session layer, e.g., layer 5 of the Open Systems Interconnection (OSI) reference model, characteristics included within SIP messages instead of relying solely on layer 2 or 3 characteristics, such as IP address/port pairs. By utilizing the techniques, network security devices may define pinholes based on the session layer characteristics of the SIP messages, such as a SIP call identifier (ID) and/or SIP tags, to ensure that only SIP messages containing the appropriate session layer characteristic flow through the network security device via a given pinhole. Moreover, based on the session layer characteristics, network security devices may more efficiently determine when a call is complete and reassign resources currently assigned to monitor the completed call to either active calls or new calls, as well as, to other pinholes that allow other types of traffic, such as TCP/IP traffic. Thus, a network security device operating in accordance with the techniques may increase security and call throughput, as well as, possibly the number of pinholes a single network security device may manage.

For example, a network security device may include a SIP module that enables the network security device to become aware of and understand SIP. Using this awareness, the network security device, upon receiving a SIP message requesting a SIP session to initiate a new call, may parse the SIP message to extract pertinent session layer characteristics or SIP-specific information, such as a SIP call identifier (ID), SIP tags, and/or SIP state information. The network security device further includes a resource manager module that manages a resource pool, the resource pool storing resources available for use by the network security device. After extracting the session layer characteristics or SIP-specific information, the SIP module via interactions with the resource manager module requests a new pinhole and that the resource manager module assign resources from the resource pool to monitor the new call. The SIP module may forward a call ID with the request so that the resource manager module may associate the pinhole and the resources with the call ID. The SIP module may ensure that subsequent SIP messages includes a call ID associated with the pinhole, thereby increasing security.

The SIP module further determines whether each of the calls has completed based on the session layer characteristics extracted from a subsequent SIP message associate with each of the calls. That is, the SIP module may, based on the SIP state information, determine that one of the call has completed. Based on the determination, the SIP module may return via interactions with the resource manager module the resources assigned to monitor each completed call to the resource pool for future use by the network security device. For example, the SIP module may parse each of subsequent SIP messages associated with a completed call to extract the call ID and issue a request to the resource manager module requesting that it remove all resources previously associated with the given call ID. In this manner, the SIP module may more efficiently utilize resources by distinguishing between multiple calls occurring over a single SIP session.

In one embodiment, a method implemented by a network security device that secures a private network from attack by a public network comprises receiving a session initiation protocol (SIP) message with the network security device from a private server located in the private network, the SIP message requesting a SIP session between a private SIP device in the private network and a public SIP device in the public network. The method further comprises, in response to the SIP message, dynamically opening a pinhole within the network security device, the pinhole allowing messages for a plurality of calls for the SIP session to concurrently flow through the network security device between the private and public devices and assigning a set of resources included within a resource pool of the network security device to monitor each call of the plurality of calls occurring over the SIP session, wherein the resource pool stores resources available for use by the network security device. The method also comprises determining whether each of the calls has completed based on an session layer characteristic of a subsequent SIP message associated with each of the calls, and based on the determination, returning the set of resources assigned to monitor each completed call to the resource pool for future use by the network security device.

In another embodiment, a network security device that secures a private network from attack by a public network comprises a resource manager module that manages a resource pool, wherein the resource pool stores resources available for use by the network security device and a Session Initiation Protocol (SIP) module. The SIP module (i) receives a SIP message from a private server located in the private network, the SIP message requesting a SIP session between a private SIP device in the private network and a public SIP device in the public network and (ii) in response to the SIP message, dynamically opening a pinhole within the network security device, the pinhole allowing messages for a plurality of calls for the SIP session to concurrently flow through the network security device between the private and public devices. The SIP module further (iii) assigns via the resource manager module a set of the available resources included within the resource pool to monitor each call of the plurality of calls occurring over the SIP session and (iv) determines whether each of the calls has completed based on an session layer characteristic of a subsequent SIP message associated with each of the calls. The SIP module also (v) based on the determination, returns via the resource manager module the set of available resources assigned to monitor each completed call to the resource pool for future use by the network security device.

In another embodiment, a computer-readable medium contains instructions. The instructions cause a programmable processor to receive a session initiation protocol (SIP) message with the network security device from a private server located in the private network, the SIP message requesting a SIP session between a private SIP device in the private network and a public SIP device in the public network. The instructions further cause the processor to, in response to the SIP message, dynamically open a pinhole within the network security device, the pinhole allowing messages for a plurality of calls for the SIP session to concurrently flow through the network security device between the private and public devices, and assign a set of resources included within a resource pool of the network security device to monitor each call of the plurality of calls occurring over the SIP session, wherein the resource pool stores resources available for use by the network security device. The instructions also cause the processor to determine whether each of the calls has completed based on an session layer characteristic of a subsequent SIP message associated with each of the calls, and based on the determination, return the set of resources assigned to monitor each completed call to the resource pool for future use by the network security device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
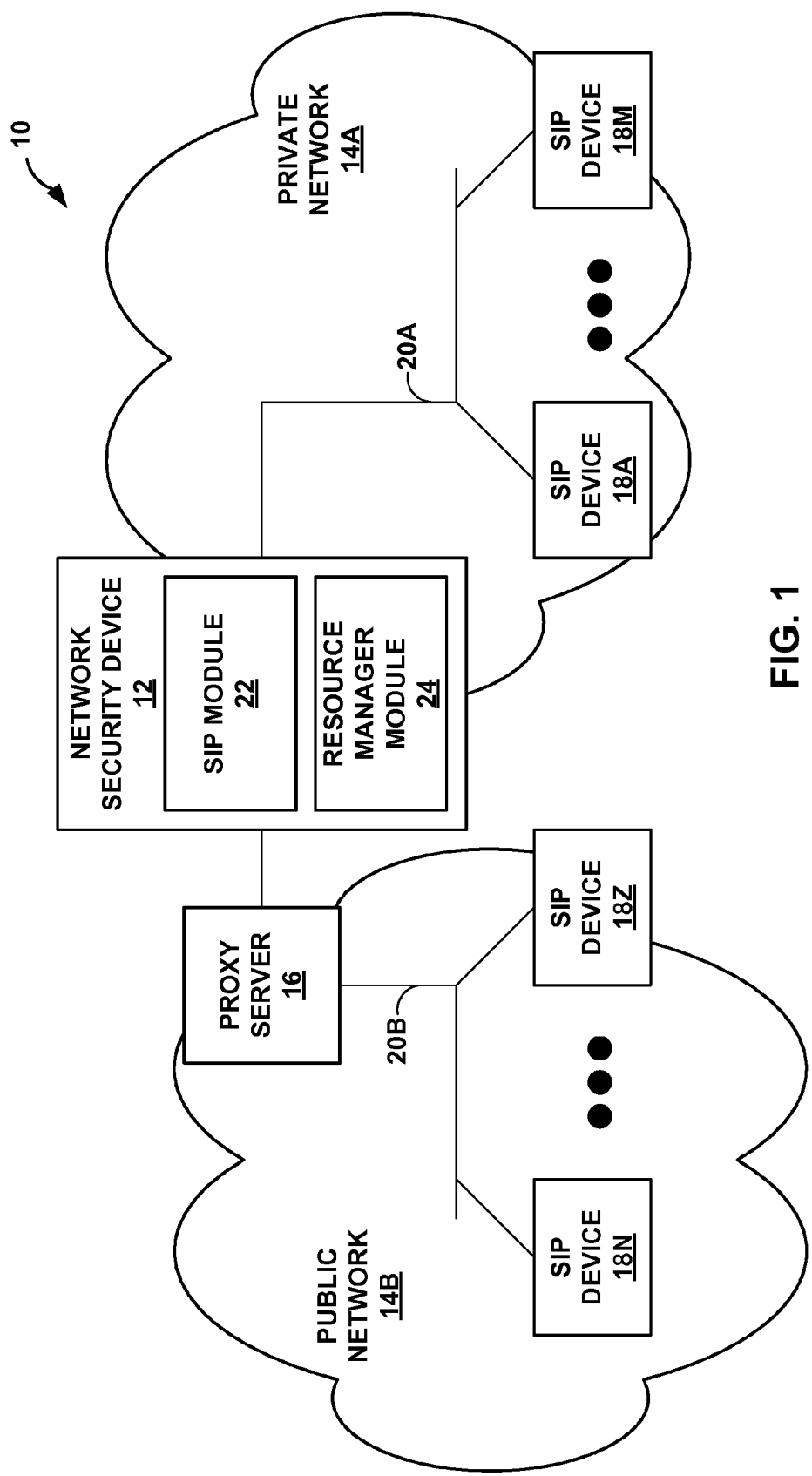
FIG. 1 is a block diagram illustrating an example network system in which a network security device performs session layer pinhole management techniques in accordance with the principles of the invention.

FIG. 1 is a block diagram illustrating an example network system 10 in which a network security device 12 performs session layer pinhole management techniques in accordance with the principles of the invention. As shown in FIG. 1, network security device 12 resides between two networks, a private network 14A and a public network 14B, and regulates and monitors traffic flowing between networks 14A, 14B ("networks 14") to secure private network 14A from attacks originating within public network 14B. Network security device 12 may comprise any network device capable of performing this security feature, such as a firewall. Notably, private network 14A includes network security device 12 to perform these security services, although network security device 12 may reside separate from private network 14A, such as within public network 14B.

Public network 14B comprises a proxy server 16 and each of networks 14 comprises respective session initiation protocol (SIP) devices 18A-18M, 18N-18Z. Private and public networks 14 may each also comprise a variety of other network devices, such as servers, hubs, routers, and switches, as well as, a variety of computing devices capable of accessing networks 14, such as personal desktop computers, laptop computers, workstations, personal digital assistants (PDAs), and cellular phones. Typically, private network 14A comprises an enterprise-level network, such as a business employs to facilitate communication between the various devices within private network 14A. Private network 14A may be "private" in the sense that network security device 12 prevents devices outside network 14A, such as those within public network 14B, from accessing network 14A. In addition, private network 14A may be "private" in the sense that a private business owns network 14A, and thus it is not available for use by the public. Typically, public network 14B comprises a service provider (SP) network that provides access to a broad network open for use by the public, such as the Internet.

Proxy server 16 generally represents a server that services requests of clients, such as SIP devices 18N-18Z, by forwarding requests to other servers. For example, if SIP device 18N requests a specific file located within the public network, proxy server 16 may receive this request and make the request for the file on behalf of SIP device 18N. In the context of SIP, proxy server 16 may further act as a SIP server, which provides a number of services pertinent to implementing Voice over Internet Protocol (VoIP). Example services include enabling SIP devices 18N-18Z to register a location, e.g., an IP address and port, to which VoIP calls designated for each SIP device 18N-18Z should be forwarded, authenticating and authorizing SIP devices 18N-18Z for VoIP services, implementing SP call-routing policies, and providing additional features to SIP devices 18N-18Z.

SIP devices 18A-18M couple to network security device 12 within private network 14A via communicative link 20A, and SIP devices 18N-18Z couple to proxy server 16 within public network 14B via communicative link 20B. SIP devices 18 may each comprise one or more of a SIP enabled device, such as telephone, a cellular phone, a desktop computer, a laptop computer, a personal digital assistant (PDA), or any other device capable of initiating, accepting, and terminating VoIP calls via SIP.

Network security device 12 includes a SIP module 22 and resource manager module 24. SIP module 22 provides network security device 12 with the SIP "awareness" described above. That is, SIP module 22 may implement a SIP stack to parse session layer, or layer 5 of the OSI model, characteristics from SIP messages. These characteristics may comprise a call ID, SIP tags, and SIP state information. Resource manager module 24 manages resources available for use by network security device 12. These resources commonly include memory or buffer space that is allocated to store packets corresponding to a given flow, a flow being identified by its "five-tuple," or source IP address, destination IP address, source port, destination port, and protocol identifier.

A VoIP call between SIP devices 18A, 18N may, for example, comprise two flows, one flow from SIP device 18A to SIP device 18N and another flow from SIP device 18N to SIP device 18A. That is, "flow" as used in this disclosure refers to unidirectional traffic between two network points, each point being identified by its respective IP address and port. Additional flows may also be associated with the same call, such as a flow from SIP device 18A to proxy server 16. Flows may also be characterized based on their respective protocol. Thus, the first three flows may comprise SIP flows, indicating that each flow comprises SIP messages or traffic. Additional flows of other protocols may also be associated with the call, such as session description protocol (SDP) or real-time transport protocol (RTP) flows. While designated separately, SDP and RTP may be considered as one and represented herein as SDP/RTP. These flows may require resources and all the resources dedicated to monitoring these flows may be associated to a particular call within resource manager module 24 by way of a unique SIP call ID associated with the call.

In the example of FIG. 1, network security device 12 receives a call initiation message (e.g., a SIP message) from one of SIP devices 18A-18M, e.g., SIP device 18A requesting a SIP session with one of SIP devices 18N-18Z, e.g., SIP device 18N. A SIP message for requesting a session, for example, is known as an "INVITE" message and it may signal the beginning of a new VoIP call. Upon receiving this INVITE message, network security device 12 first determines the flow by parsing a header included within the INVITE message to extract a five-tuple. Based on this five-tuple, network security device 12 determines whether a pinhole exists to service the flow. That is, network security device 12 compares the private and public IP address/port pairs of each open pinhole respectively to the source and destination IP address/port pairs of the extracted five-tuple. Assuming for purposes of illustration that a pinhole has not been previously opened to service the flow, network security device 12 applies policies or other rules to determine an action with respect to the INVITE message.

One such policy may indicate that destination and source ports equal to 5060 indicates that the INVITE message is a SIP message, as port 5060 is commonly used for or associated with SIP. The policy therefore may cause network security device 12 to forward the INVITE message to SIP module 22. SIP module 22 may, as described below in more detail, apply a SIP stack to the INVITE message to verify the INVITE message as a SIP message, and subsequent to verification, parse the INVITE message to extract session layer characteristics, such as a call identifier (ID), SIP tags, and SIP state information, associated with the new VoIP call. SIP module 22, based on the session layer characteristics and flow five-tuple, may initiate the opening of a new pinhole and associate the pinhole and the flow with the new VoIP call.

To initiate the opening of a new pinhole, SIP module 22 issues a request to resource manager module 22 requesting resources for a new pinhole. The request may provide the five-tuple identifying the flow and the call ID. Resource manager module 22 may first determine whether sufficient resources exist for a new pinhole. Assuming sufficient resources exist, resource manager module 22 may open a new pinhole by setting the private IP address/port pair to the source IP address/port pair of the five tuple, i.e., the IP address/port pair of SIP device 18A. SIP module 22 may extract the private IP address/port pair from a SIP signaling message and forward it to resource manager 22. For example, SIP module 22 may extract the private IP address/port pair from a "VIA," "Contact," or "Record-Route" header of an INVITE message. These other headers are described in more detail below.

However, because device 18N lies behind proxy server 16, SIP device 18A most likely does not know the particular IP address assigned to device 18N and thus the destination IP address and port of the five-tuple may be undefined. Moreover, SIP device 18N may comprise a portable SIP device, such as a SIP-enabled cell phone, that may not have a static IP address or may move between multiple networks frequently. In this instance, SIP device 18N may register with proxy server 16 its location or assigned IP address, such that proxy server 16 may locate SIP device 18N at any point of time. Network security device 12 may not be privy to this information, especially considering that network security device 12 is not a member of public network 14B. Thus, network security device 12 and, more particularly, resource manager module 24 may be unable to define the public IP address/port pair as any one IP address and port. This limitation causes resource manager module 22 to specify the public IP address/port pair of the pinhole to include all available IP addresses (e.g., X.X.X.X/32) and ports.

Notably, this pinhole allows any public device bearing a valid IP address/port pair to access SIP device 18N, which opens a substantial or "coarse" hole in network security device 12. Conventional network security devices frequently perform no further security verification and therefore permit possibly any device to access private network 14A. Network security device 12, however, in accordance with the session layer pinhole management techniques, performs additional session layer pinhole management to tighten or more precisely define the pinhole. To tighten the pinhole, resource manager module 24 allocates resources to monitor the new flow and further associates these newly allocated resources with the call ID and/or SIP tags. By associating the flow with the call ID, resource manager module 24 may, upon receiving successive messages, determine whether the messages belong to one of the flows currently permitted to flow through the pinhole. If not, network security device 12 may drop the message. If so, network security device 12 may permit the message to traverse network security device 12.

To continue the above example, network security device 12, after establishing the pinhole and associating the call ID included within the INVITE message to the allocated resources, may forward the INVITE message to proxy server 16. Proxy server 16 may parse the INVITE message to extract a unique SIP identifier, which may resemble a telephone number or email address. Based on this SIP identifier, proxy server 16 may access a registration table that stores the current location, e.g., IP address and port, of SIP device 18N. Proxy server 16 may forward the INVITE message to SIP device 18N at the stored location.

Upon receiving the INVITE message, SIP device 18N responds with a "100 TRYING" SIP message, indicating that it is trying to establish the SIP session. The 100 TRYING message comprises a five-tuple with the source IP address and port equal to that of SIP device 18N and the destination IP address and port equal to that of SIP device 18A. The 100 TRYING message also includes the same call ID as that of the previous INVITE message. Network security device 12 receives the 100 TRYING message, and as before, first determines whether any pinholes have been opened previously to permit this flow to traverse network security device 12. In this instance, a previous pinhole exists, e.g., the pinhole opened in response to the INVITE message, as the public IP address/port pair permits any public device to access the IP address/port pair assigned to SIP device 18A, which the 100 TRYING message designates as its destination IP address and port. However, network security device 12 recognizes the security issue described above and determines that the pinhole only partially matches. On a partial match, network security device 12 forwards the 100 TRYING message to the owner of the pinhole, which in this case is resource manager module 24 as it created the pinhole. Resource manager module 24, however, is not aware of SIP and cannot extract the necessary call ID to perform the session layer match.

To finish the match, resource manager module 24 forwards the 100 TRYING message to SIP module 22, which as described above, parses the 100 TRYING message to extract the pertinent session layer characteristics or SIP information, such as the call ID, SIP tags, and SIP state information. SIP module 22 returns this SIP information or session layer characteristics to resource manager module 22, which utilizes at least the call ID to determine whether the pinhole is associated with the call ID. In this instance, the pinhole is associated with the call ID, but the flow from SIP device 18N to SIP device 18A has not yet been associated with the call ID. Because the call ID matches and the SIP state information indicates a proper response, SIP module 22 may request that resource manager module 24 add this new flow and open another pinhole to service this flow, because SIP module 22 now knows the IP address/port pair assigned to SIP device 18N and may set the public IP address/port pair of the additional pinhole to the IP address and port of SIP device 18N in order to narrow the previous pinhole. After adding the flow, network security device 12 forwards the 100 TRYING message to SIP device 18A.

Additional SIP messages may continue to traverse between SIP devices 18A, 18N and these messages may include a "180 RINGING" message, a "200 OK" message, an "ACK" message, and a "BYE" message. Further information regarding SIP, SIP messages, the various services and features of SIP, as well as, general information regarding SIP elements such as SIP servers or SIP proxy servers can be found in Request for Comments (RFC) 2543, titled "SIP: Session Initiation Protocol," prepared by the Network Working Group of the Internet Engineering Task Force (IETF), dated February 1997, herein incorporated by reference. Further information may also be found in RFC 326,1 titled "SIP: Session Initiation Protocol," prepared by the Network Working Group of the Internet Engineering Task Force (IETF), dated June 2002, herein also incorporated by reference.

Network security device 12 may utilize the session layer pinhole management techniques described above to verify that each of these messages include the same call ID, thereby narrowing the course definition of pinholes that previously relied only on layer 2, 3, or 4 characteristics, such as IP address/port pairs. Using these techniques, network security device 12 analyzes session layer characteristics, such as a call ID, to clearly identify whether the pinhole permits the flow associated with the call ID. Thus, only message bearing the appropriate call ID and from an appropriate flow can traverse network security device 12, thereby providing a further measure of security relative to conventional network security devices.

Figure 2:
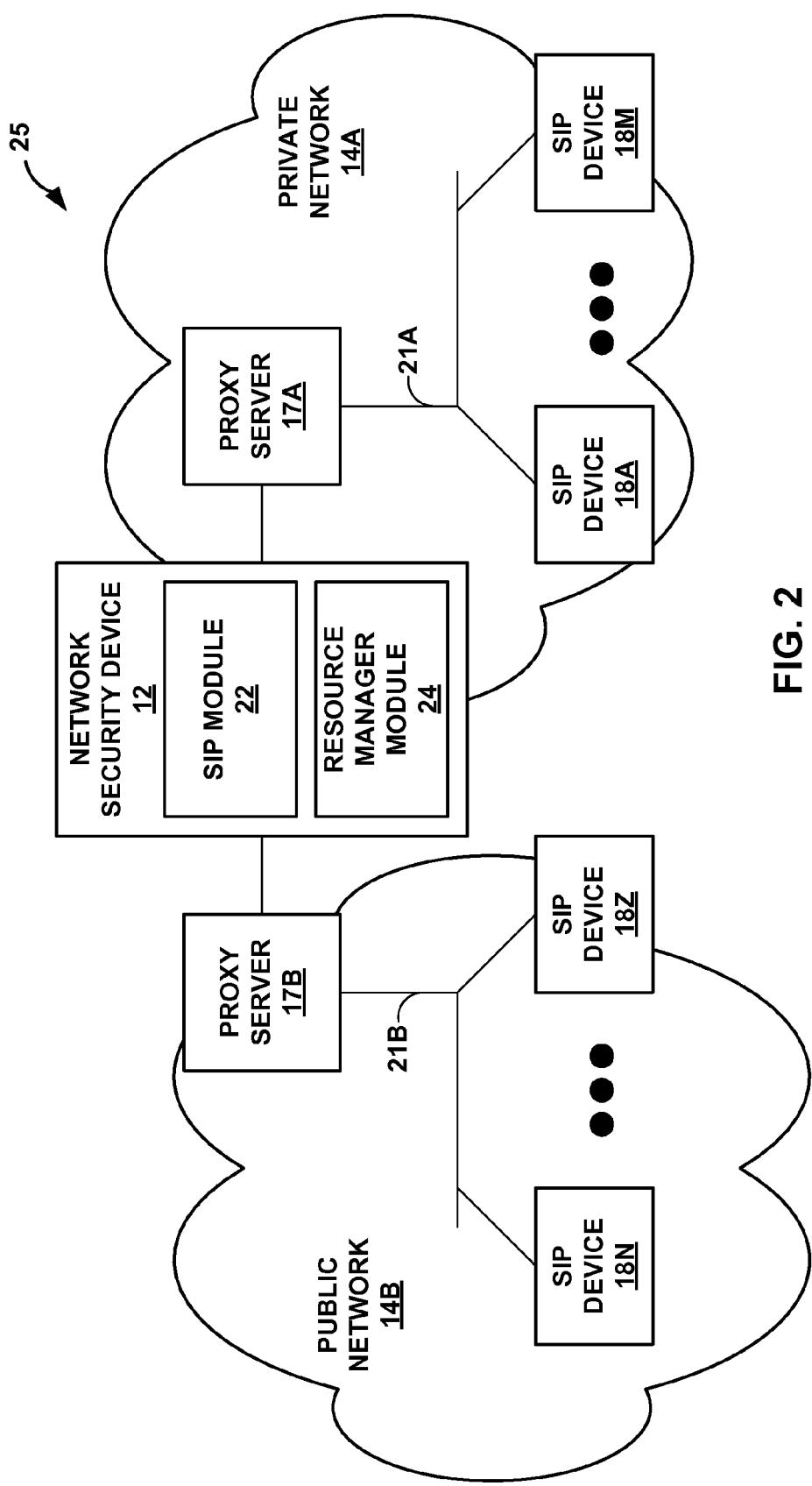
FIG. 2 is a block diagram illustrating another example network system in which a network security device performs session layer pinhole management techniques in accordance with the principles of the invention.

FIG. 2 is a block diagram illustrating another example network system 25 in which network security device 12 performs session layer pinhole management techniques in accordance with the principles of the invention. Network system 25 is substantially similar to network system 10 of FIG. 1 in that both include a network security device 12 that separates a private network 14A from a public network 14B, each of networks 14 having respective SIP devices 18. The main difference between network systems 25 and 10 is that network system 25, as shown in FIG. 2, comprises two proxy servers, proxy servers 17A, 17B, instead of single proxy server, proxy server 16.

Proxy servers 17A, 17B ("proxy servers 17") each may be substantially similar to proxy server 16 of FIG. 1 and may perform the same operations described above with respect to proxy server 16. As shown in FIG. 2, proxy server 17A resides within private network 14A and SIP devices 18A-18M of private network 14A couple to proxy server 17A via communicative link 21A. Proxy server 17B resides within private network 14B, and similar to proxy server 16, SIP devices 18N-18Z couple to proxy server 17B via communicative link 21B.

While network security device 12 still separates networks 14 and prevents attacks originating in public network 14B from reaching private network 14A, network security device 12, in this instance, receives at least some SIP messages from proxy server 17A instead of directly from SIP devices 18A-18M. Because of this configuration, network security device 12 may utilize a single pinhole to service multiple calls. In the prior example of FIG. 1, each call initiated by SIP devices 18A-18M could be distinguished based on the source IP address and port of each SIP message. That is, SIP device 18A, for example, would include the IP address and port assigned to SIP device 18A as the source IP address and port of the INVITE SIP message that network security device 12 receives. In the example of FIG. 2, proxy server 17A receives this INITIAL message from, for example, SIP device 18A, and forwards the INVITE Message to network security device 12.

Proxy server 17A, however, replaces the IP address and port assigned to SIP device 18A with an IP address and port assigned to proxy server 17A within the five tuple. That is, proxy server 17A, before forwarding the INVITE message, updates the source IP address and port of the five-tuple to reflect that proxy server 17A acts as the source of the INVITE message. Proxy server 17A may also append a VIA header to the INVITE message or, in some instances, change an existing header, e.g., a contact header, of the INVITE message to reflect its own IP address/port pair to replace the IP address/port pair of SIP device 18A.

In response to the addition of proxy server 17A, network security device 12 opens the first pinhole such that the private IP address/port pair equals the IP address and port assigned to proxy server 17A not SIP device 18A, as previously described above with respect to FIG. 1. Subsequent INVITE messages sent from other devices 18B-18M are also serviced by proxy server 17A, which again updates the five-tuple to reflect that proxy server 17A is the source of the INVITE message before forwarding the subsequent INVITE messages to network security device 12.

Conventional network security devices, upon receiving these subsequent INVITE messages, attribute each of the subsequent INVITE messages as occurring over a single flow because these devices rely only on the IP address and port to distinguish flows. Thus, all SIP communications occurring in one direction between proxy servers 17, or over what is referred to as a "SIP trunk," is seen as one flow, even though in reality each call comprise separate flows. As the SIP trunk may transport significant numbers of calls (10s, 100s, etc.), resource manager module 24 may assign a correspondingly substantial number of resources to handle this traffic. As the percent of available resources assigned to this one flow grows, conventional network security devices may begin to slow, possibly fail to open additional pinholes, and may begin to drop calls. These effects may arise because the conventional devices do not distinguish between flows and, as a result, cannot distinguish when a flow need be terminated and the resources freed for other calls and uses. That is, the conventional devices view all communications occurring in one direction over the SIP trunk as a single flow and possibly only release these resources once every call has completed.

Contrary to these conventional devices, network security device 12, as described above, identifies each flow and associates each flow with a particular call by associating resources allocated to monitor each flow with a call ID. As described above, this enables network security device 12 to provide a more secure wall between networks 14 because the pinhole through which the flows pass are narrowed based on session layer characteristics. While facilitating this enhanced security, the session layer pinhole management techniques may also enable more efficient allocation of resources to avoid the issues discussed above with respect to conventional network security devices.

For example, network security device 12 may receive an initial INVITE message from proxy server 17A, which is acting on behalf of SIP device 18A. Upon receiving this INVITE message, network security device 12, as described above, determines whether a pinhole has previously been opened to service this flow. As this flow represents a flow over a SIP trunk in this instance, a pinhole most likely previously has been opened to service this flow and it is assumed for ease of illustration purposes that a pinhole previously existed to permit this flow to traverse network security device 12.

However, as described above, network security device 12 may only determine a partial match, and forward the INVITE message to resource manager module 24, i.e., the owner of the pinhole. Resource manager module 24, being unaware of SIP, forwards the INVITE message to SIP module 22, which parses the INVITE message to extract session layer characteristics or SIP information, such as a call ID, SIP tags, and SIP state information. Based on the SIP state information, SIP module 22 recognizes that the message is a SIP message and, in response, issues a request to resource manager module 24 requesting that resource manager module 24 allocate resources to monitor the flow and associate these resources with the parsed call ID. After adding the flow and associating the resources with the call ID, network security device 12 forwards the INVITE message to the destination IP address/port designated by the five-tuple of the INVITE message.

The VoIP call between SIP devices 18A, 18N may continue and device 18N may transmit a 100 TRYING message and a 180 RINGING message. Once the user of SIP device 18N answers the call, device 18N sends a 200 OK message, whereupon the VoIP call data is transmitted via a Session Description Protocol (SDP), a Real-time Transport Protocol (RTP), or both. Throughout these transaction, network security device 12 and, more particularly, resource manager module 24 may open additional pinholes, such as additional SIP pinholes, SDP pinholes, and/or RTP pinholes to allow various flows to traverse network security device 12 and each of these pinholes, as well as, the various SIP, SDP, RTP flows may be associated with the call ID by associating the resources allocated to these flows to the call ID.

For example, these additional pinholes may comprise signaling pinholes based on a "VIA" tag or header, a "Contact" tag or header, and a "Record Route" tag or header of a SIP message. The VIA tag contains the address at which other elements in the network, such as SIP devices 18A-18Z, should send the response to the message that includes the VIA header. The contact header field defines an address to which these other elements should send future requests. The record route header contains a universal resource identifier that enables these other elements to resolve a hostname or IP address of a proxy server. Thus, using the address extracted from these headers, the additional signaling pinholes may be established.

The SIP session terminates when either of SIP devices 18A, 18N terminate the call typically by "hanging up" either of SIP devices 18A, 18N. If, for example, SIP device 18N terminates the call, device 18N transmits a BYE SIP message, which device 18A responds to by sending a 200 OK SIP message. Network security device 12 receives both of these messages, and because SIP module 22 is aware of SIP, network security device 12 understands that the call has completed upon receiving either or both of the BYE message or the final 200 OK message. Therefore, SIP module 22 may instruct resource manager module 24 to remove flows associated with a call ID extracted from either or both of those messages. By organizing the call flows, or rather the resources assigned to monitor call flows, according to the call ID, resource manager module 24 may quickly remove resources upon completion of the call, unlike conventional network security devices that only remove resources, if at all, infrequently during lulls in call volumes and independent of the actual termination of any one call. Thus, network security device 12 by becoming aware of SIP via SIP module 22 not only enhances security by narrowing course pinholes but also more efficiently utilizes its resources.

Figure 3:
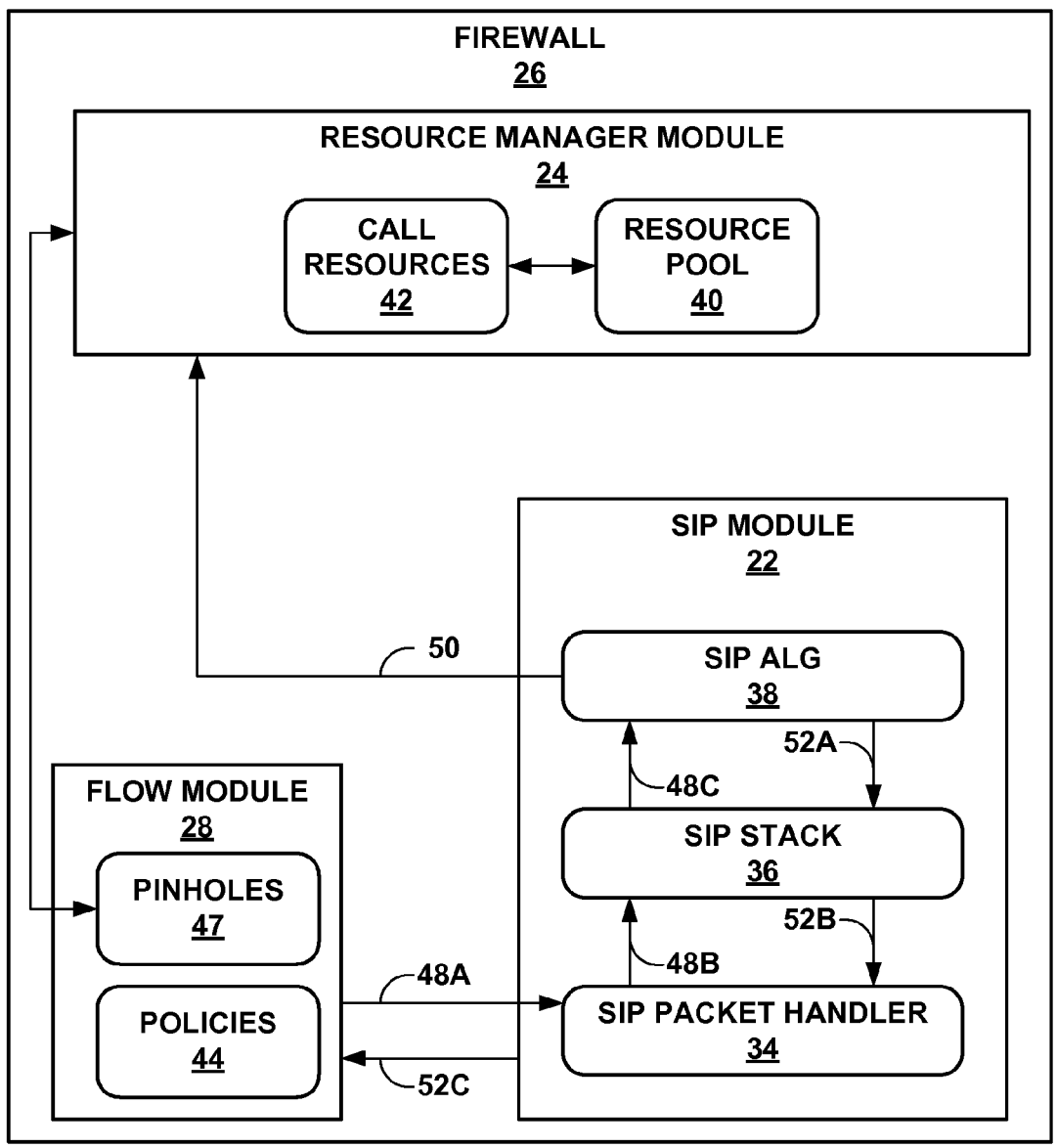
FIG. 3 is a block diagram illustrating an example firewall that performs the session layer pinhole management techniques disclosed herein.

FIG. 3 is a block diagram illustrating an example firewall 26 that performs the session layer pinhole management techniques disclosed herein. Firewall 26 represents an exemplary embodiment of network security device 12 of FIG. 1 or 2 and therefore is substantially similar to network security device 12, in that both comprise a SIP module 22 and a resource management module 24. As shown in FIG. 3, firewall 26 further comprises flow module 28. Although not shown in FIG. 1, network security device 12 may also comprise the additional modules described in reference to firewall 26, as well as, operate in a substantially similar manner to that of firewall 26 as described below.

SIP module 22 of firewall 26 provides the session layer awareness described above. In particular, SIP module 22 includes a SIP packet handler 34, a SIP stack 36, and a SIP session layer gateway 38 ("SIP ALG 38"). SIP packet handler 34 handles SIP messages or packets and makes a cursory determination of whether these packets should be forwarded to SIP stack 36. SIP stack 36 represents SIP dialog and transaction state machines to manage respective dialogs, e.g., a peer-to-peer SIP relationship between two devices, and transactions. A transaction includes a request sent by a client to a server, as well as, all responses to the request sent from the server back to the client. Further information regarding dialogs and transactions can be found in Request for Comments (RFC) 3261, titled "SIP: Session Initiation Protocol," prepared by the Network Working Group of the Internet Engineering Task Force (IETF), dated June 2002, herein incorporated by reference. SIP stack 36 forwards the dialog and transaction states to SIP ALG 38.

SIP ALG 38 receives and maintains the call states for each INVITE dialog for the entire lifetime of each call and also maintains the transaction states for each request/response, both as per RFC 3261. SIP ALG 38 also initiates the opening and closing of pinholes, as well as, the associated allocation and return of resources used to monitor call flows permitted by pinholes to traverse firewall 26.

Resource manager module 24 of firewall 26 includes a resource pool 40 and call resources 42. Resource pool 40 stores the above described resources that are available for use by firewall 26. Call resources 42 represent those resources that pinhole management module 22 requested resource manager module 24 to assign to monitor a given call flow. That is, call resources 42 comprise resources associated with an session layer characteristic or SIP information, such as the SIP Call ID and/or SIP tags.

Flow module 28 represents a module responsible for classifying and managing flows. As described above, a flow typically comprises a unidirectional flow of messages, such as a TCP flow, and can be identified by a five-tuple included within each message of the flow. To manage these and other flows, flow module 28 includes policies 44 and pinholes 47, where policies 44 represent various actions flow module 28 may take based upon a particular flow's five-tuple. Pinholes 47 represent open pinholes, each pinhole defining a private and public IP address/port pair and each pinhole being associated with its owner, such as resource manager module 24.

Flow module 28 may, for example, intercept a SIP packet from a server, such as proxy server 17A of FIG. 2, or directly from a device, such as device 18A of FIG. 2, requesting a SIP session with a device located within a public network, such as device 18N of public network 14B shown in either of FIG. 51 or 2. Proxy server 16A may forward an INVITE SIP message or packet to request the SIP session. Flow module 28 may parse the packet to obtain the five-tuple. Based on the source IP address, destination IP address, source port, and destination port of the five-tuple, flow module 28 accesses pinholes 47 and/or policies 44 to determine the appropriate action.

Flow module 28 may first access pinholes 47 to determine whether the source IP address/port and destination IP address/port of the five-tuple match any respective public and private IP address/port pairs of any open pinholes 47. If so, flow module 28 may determine a partial match, as described above. In this instance, an INVITE message may match one of pinholes 47 opened by server 17A to initiate a previous SIP session, as described above. If so, flow module 28 may transfer control of the SIP message to the owner of the partially matched pinhole 47, i.e., resource manager module 24, to complete the match, which in turn may forward SIP message to SIP module 22 to complete the match as resource manager module 24 is not aware of SIP. However, for purposes of illustration, it is assumed that no previous SIP session has been initiated by server 17A, and therefore none of pinholes 47 match the five-tuple.

Assuming that no pinhole matches, flow module 28 next accesses policies 44 to determine an appropriate default action. An exemplary policy 44 may determine whether the destination port of the flow five-tuple equals 5060, as port 5060 is a port commonly used for servicing SIP messages. Thus, if the source, destination, or both ports of the five-tuple equal 5060, flow module 28 in accordance with policies 44 determines that the message is a SIP message, and forwards SIP message 48A to SIP packet handler 34. If none of policies 44 provide an action for the packet, flow module 28 may drop the packet. It is further assumed for purposes of illustration that policies 44 cause flow module 28 to forward the INVITE message to SIP module 22, which is shown as INVITE message 48A in FIG. 3.

SIP packet handler 34 receives SIP message 48A and performs basic operations to ensure INVITE message 48A was properly constructed and received without error. Upon performing these basic operations, SIP packet handler 34 forwards the INVITE message, shown as INVITE message 48B, to SIP stack 36. SIP stack 36 parses INVITE message 48B to determine the above described SIP information, which it forwards to SIP ALG 38 possibly with INVITE message 48C.

SIP ALG 38, upon receiving the SIP information and message 38C, may first determine whether resources need be assigned to monitor the call and whether a pinhole need be opened. In this instance, the dialog and transaction states indicate that server 16A is attempting to initiate a call that previously was not active or, in other words, invite a conversation. SIP ALG 38, in response to receiving INVITE message 38C, issues a request 50 to resource manager module 24 requesting available resources from resource pool 40 be assigned to monitor the new call, e.g., set aside as a call resource 42. The request may designate an existing pinhole or may request that a new pinhole be opened, if no other pinhole has been opened to service SIP call flows. Assuming no other pinhole has been opened, as described above, request 50 requests that resource manager 24 open a new pinhole and assign resources to monitor the new flow associated with the call, or call flow. Request 50 therefore typically includes a source IP address/port, a destination IP address/port, the SIP call ID, and possibly other SIP information, such as SIP tags, where the destination IP address/port are used to open the pinhole and the call ID and/or SIP tags are used to associate the resources assigned to monitor the flow to a particular call within call resources 42.

Upon receiving request 50, resource manager module 24 first determines whether sufficient resources exist in resource pool 40 to monitor the call flow. If not, resource manager module 24 may return an error or warning to SIP ALG 38 indicating that insufficient resources exist to open the pinhole and/or monitor the call. SIP ALG 38 may, in the event of insufficient resources, respond to INVITE message 48C that the call was not accepted or that some other error occurred, and forward this SIP message 52A to SIP stack 36. SIP stack 36 receives SIP message 52A, updates the respective dialog and transaction states to indicate the call has completed or that some other error occurred, and formulates the response to the original INVITE message 48A. SIP stack 36 forwards response SIP message 52B to SIP packet handler 34, which performs the above described checks to verify SIP message 52B meets SIP standards. SIP packet handler 34 forwards the SIP message 52B to an interface card or some other interface for delivery to server 17A or directly to device 18A.

However, if resource manager module 24 determines that sufficient resources exist in resource pool 40 to open a new pinhole, resource manager module 24 allocates resources from resource pool 40 to the particular call flow and associates these resources with the call ID within call resources 42. Resource manager module 24 opens a new pinhole by defining a new pinhole 47 such that the private IP address/port pair equals those assigned to proxy server 17A, for example, and the public IP address/port pair equals any IP address/port combination, e.g., a public IP address equal to X.X.X.X/32 and a public port number of XXXX. After assigning resources within call resources 42 to monitor the new call flow, resource manager module 24 returns the newly added call flow to SIP ALG 38 along with a match message indicating the newly added call flow is associated with the call ID. SIP ALG 38 may forward the match message and flow to flow module 28, as shown by message 52C. Flow module 28, upon receiving this message, forwards the INVITE message to public network 14B.

Subsequent messages that occur in response to the INVITE message, such as the 100 TRYING message, the 180 RINGING message, and the 200 OK message, are each identified by their respective five-tuples by flow module 28 as being allowed by new pinhole 47. Flow module 28, as described herein, forwards the message by way of resource manager module 24 to SIP packet handler 34, which performs the checks and forwards the message to SIP stack 36. SIP stack 36 parses the dialog and transaction states and forwards the states to SIP ALG 38 for processing. SIP ALG 38 monitors the flows associated with the call by determining the call ID associated with each message and accessing via resource manager module 24 call resources 42 assigned to monitor flows associated with the particular call ID. SIP ALG 38 may therefore ensure that the responses generated by the public device, e.g., SIP device 18N, are valid responses. That is, SIP ALG 38, because it is aware of the session layer, ensures that the responses make sense in light of the current dialog and transaction states. If a message were to arrive out of order or not define a proper state, SIP ALG 38 may drop the packet or issue a response to the packet, as described above, to indicate the error.

Upon receiving the final 200 OK message, i.e., the one subsequent to the BYE message, from flow module 28 after it traverses SIP packet handler 24 and SIP stack 36, SIP ALG 38 may determine based on the current dialog and transaction states that the call has completed. SIP ALG 38 may forward a request to resource manager module 24 requesting that resources assigned to the call ID extracted from the 200 OK message be returned to resource pool 40. The request may further designate the source and destination IP addresses and ports, which resource manager module 24 may utilize in determining whether any calls are actively using new pinhole 47 after removing the completed call. If, upon removing the resources assigned to the now completed call, no other calls are actively passing through new pinhole 47, resource manager module 24 may remove new pinhole 47. In some embodiments, resource manager module 24 may keep new pinhole 47 alive for some set or dynamic amount of time. In any event, resource manager module 24 may more precisely open and close pinholes due to the session layer awareness SIP module 32 provides to pinhole management module 22. Once removed, ALG 38 may forward the final 200 OK message via the above described method to proxy server 16A.

The session layer pinhole management techniques are described above with respect to a number of modules and components, however, these modules and components are presented merely for purposes of illustration. The modules may be implemented as separate functionalities of a single hardware component or of a single software program. Moreover, the modules may be implemented as a combination of both hardware and software. For example, a computer-readable medium may store instructions (e.g., software) that cause a programmable processor (e.g., hardware) to perform the session layer pinhole management techniques described herein. The techniques, therefore, should not be strictly limited to the particular exemplary embodiments described herein and may include a number of other embodiments.

Figure 4:
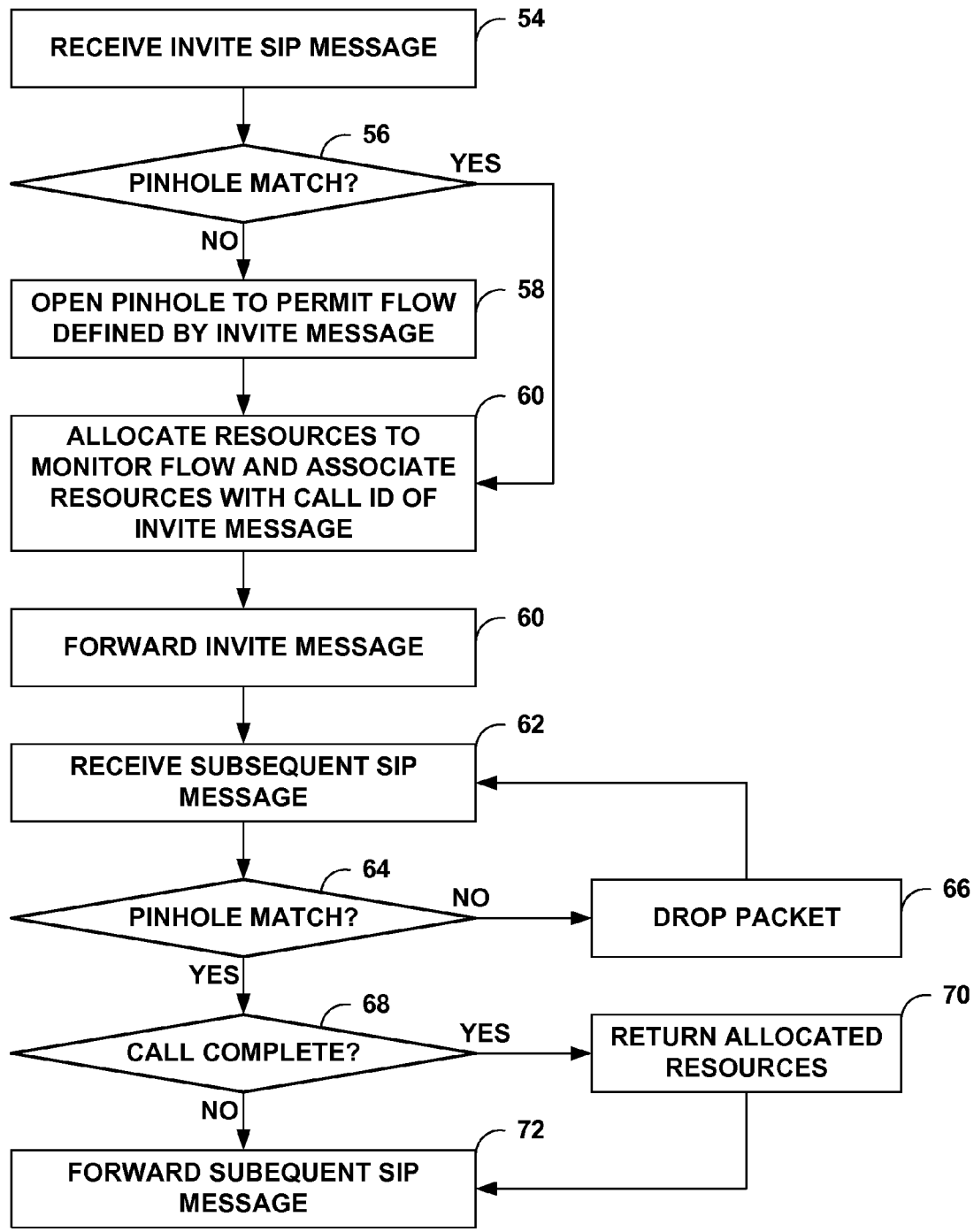
FIG. 4 is a flow chart illustrating exemplary operation of a network security device in performing the session layer pinhole management techniques described herein.

FIG. 4 is a flow chart illustrating exemplary operation of a network security device in performing the session layer pinhole management techniques described herein. Although described below with respect to a particular network security device, i.e., firewall 26 of FIG. 3, the session layer pinhole management techniques may be performed by any network security device, such as network security device 12 of FIGS. 1 and 2.

Initially, flow module 28 receives an INVITE SIP message from either of a proxy server, such as proxy server 17A of FIG. 2, or a SIP device, such as SIP device 18A of FIG. 1 (54). Regardless of which device sent the message, flow module 28 initially determines whether the INVITE message matches any of pinholes 47 in the manner described above (56). If not, flow module 28 may apply policies 44, such as the port 5060 policy 44 described above, to open a new pinhole 47 that permits flow defined by the five-tuple included within the header of the INVITE message to traverse firewall 26 (58). If a pinhole matches, the match by flow module 28 can only be described as a partial match because the match is based on only the layer 2, 3, or 4 characteristics extracted from the INVITE message. To complete the match, flow module 28 forwards the INVITE message to the owner of the matched pinhole 47, i.e., resource manager module 24.

Resource manager module 24, not being aware of SIP, may determine that the pinhole permits a number of flows, all of which match the layer 2, 3, or 4 characteristics. To further determine whether the pinhole permits the INVITE message, resource manager module 24 forwards the INVITE message to SIP module 22, which parses the INVITE message to extract the SIP information, as described above. SIP module 22 and, more particularly, SIP ALG 38 transmits the extracted SIP information, e.g., a call ID and/or SIP tags, to resource manager module 24 via a request. The request requests that resource manager module 24 allocate resources from resource pool 40 to call resources 42 to monitor the flow defined by the five-tuple of the INVITE message. During the allocation, resource manager module 24 also associates the allocated resources with the call ID (60). Resource manager module 24 may perform the same resource allocation and association operation after opening the pinhole if no pinhole matches the INVITE message, such as occurs when SIP devices 18A-18M directly connect to firewall 26 (58-60).

After allocating the resources and associating the resources with the call ID, firewall 26 may forward the INVITE message toward public network 14B (62). Firewall 26 may receive a subsequent SIP message, such as a 100 TRYING message or a 180 RINGING message, which flow module 28 proceeds to match against pinholes 47, as described above (62, 64). The match returns the previously opened pinhole 47, which was opened in response to the initial INVITE message, but again this match is only partial. Flow module 28 forwards the subsequent SIP message to resource manager module 24, which proceeds to forward the message to SIP module 22. SIP module 22 again extracts the SIP information, which it forwards to resource manager module 24 for use in determining whether the pinhole permits flows associated with the extracted SIP information (64). Based on the state information, SIP module 22 may request that resource manager module 22 add additional flows as described above, but in some instances may determine that the subsequent message, based on the state information, is out of order or otherwise unresponsive to past messages. In the instance of an improper message, resource manager module 24 may return no match, which flow module 28 may interpret as a signal to drop the message (66). Flow module 28 may not necessarily drop the message, but may instead apply policies 44 or perform some other action in an attempt to save the message before dropping it. If dropped or otherwise not permitted by one of pinholes 47, firewall 26 may receive subsequent SIP messages (62).

If the pinhole does permit flows associated with the SIP information or the state information indicates that it is appropriate for resource manager module 24 to add the flow, SIP module 22 and, more specifically, SIP ALG 38 may determine whether the call has completed (68). SIP ALG 38 may determine whether the call has completed based on the state information received from SIP stack 36 after SIP stack 36 has parsed the subsequent SIP message. Being aware of SIP, SIP ALG 38 understands that a BYE message followed by a 200 OK message indicates that the call has completed. If the subsequent message comprises either of the BYE message or the final 200 OK message, SIP ALG 38 may determine that the call associated with the call ID has completed and request resource manager module 24 to return call resources 42 associated with the given call ID to resource pool 40 (70). If the call has not completed or even if it has completed, firewall 46 forwards the subsequent message towards either of networks 14 depending on the destination IP address of the five-tuple (72). In this manner, a network security devices, such as firewall 26, may employ the session layer pinhole management techniques to associate resources used to monitor call flows with a session layer characteristic, such as any one of the above defined SIP information, determine when the call has completed, and efficiently return those resources to a resource pool.

Figure 5:
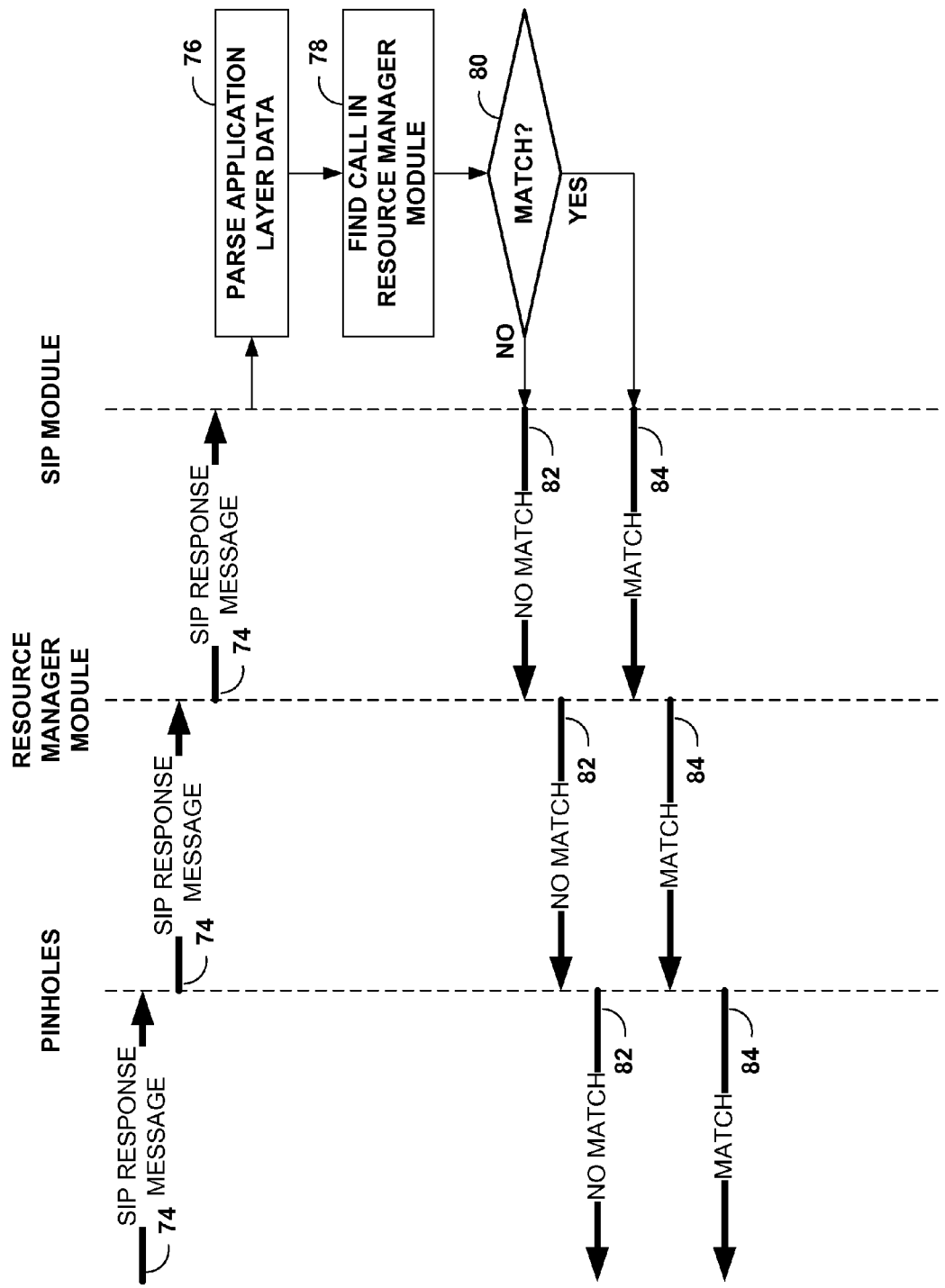
FIG. 5 is a flowchart illustrating exemplary operation of a network security device in determining whether a SIP response message matches an open pinhole in accordance with the principles of the invention.

FIG. 5 is a flowchart illustrating exemplary operation of a network security device in determining whether a SIP response message matches an open pinhole in accordance with the principles of the invention. A SIP response message may comprise any SIP message but the INVITE SIP message, such as a 100 TRYING SIP message, a 180 RINGING SIP message, an ACK SIP message, a 200 OK SIP message, and a BYE SIP message. Thus, it is assumed below that a new pinhole 47 was opened in response to a previous INVITE message. Although described below with respect to a particular network security device, i.e., firewall 26 of FIG. 2, the precise pinhole management techniques may again be performed by any network security device, such as network security device 12 of FIG. 1.

Initially, flow module 28 receives SIP response message 74 and applies pinholes 47 to determine whether one of pinholes 47 matches the source and destination IP address/port pairs, as described above. Considering that this is a response message, new pinhole 47 matches SIP response message 74 but this is only a partial match. The match is partial because pinhole 47 may not include some SIP information, such as a SIP "To" tag, to match against the same SIP information of SIP response message 74. New pinhole 47 therefore transmits the message to its owner, i.e., the module responsible for creating new pinhole 47 or resource manager module 24. Resource manager module 24 receives SIP response message 74 but cannot correctly determine to which call the SIP response message belongs because module 24 is not aware of the session layer. Thus, resource manager module 24 forwards the SIP response message to SIP module 22, which proceeds to process SIP response message 74.

To begin processing the message, SIP packet handler 34 performs the above described verification operations, and SIP stack 36 parses the session layer data to determine the dialog and transaction states. SIP stack 36 forwards the dialog and transaction states to SIP ALG 38, which receives these states and further parses the session layer data from SIP response message 74 to determine the call ID and SIP tags associated with SIP response message 74 (76). SIP ALG 38 issues a request 50 to resource manager module 24 requesting that resource manager module 24 determine whether resources are assigned to monitor a call associated with the call ID parsed from SIP response message 74. In other words, SIP ALG 38 issues a request to find the resources identified by the parsed call ID and allocated by resource manager module 24 as call resources 42 (78). Resource manager module 24, in response to the request, replies with either a match or a no match (80), which SIP ALG 38 receives and processes to issue no match message 82 or match message 84.

Regardless of which message 82, 84 SIP ALG 38 issues, either of no match or match messages 82, 84 propagate back through resource manager module 24 to flow module 28. Flow module 28, in response to no match message 82, may perform other operations, such as apply policies 44, to determine further actions with respect to SIP response message 74. Flow module 28, in response to match message 84, may forward the SIP response message 74 on to its destination.

Various embodiments of the invention have been described. These and other embodiments are within the scope of the following claims.

The invention claimed is:

1. A method implemented by a network security device that secures a private network from attack by a public network, the method comprising:

receiving a session initiation protocol (SIP) message with the network security device from a private server located in the private network, the SIP message requesting a SIP session between a private SIP device in the private network and a public SIP device in the public network;

in response to the SIP message, dynamically opening a pinhole within the network security device, the pinhole allowing messages for a plurality of calls for the SIP session to concurrently flow through the network security device between the private and public devices;

assigning a set of resources included within a resource pool of the network security device to monitor each call of the plurality of calls occurring over the SIP session, wherein the resource pool stores resources available for use by the network security device;

determining whether each of the calls has completed based on a session layer characteristic of a subsequent SIP message associated with each of the calls; and based on the determination, returning the set of resources assigned to monitor each completed call to the resource pool for future use by the network security device.

2. The method of claim 1, wherein the network security device comprises a firewall.

3. The method of claim 1, wherein assigning a set of resources includes assigning one or more of a memory resource and a buffer resource included within the resource pool to monitor each of the calls occurring over the SIP session.

4. The method of claim 1, wherein receiving the SIP message comprises receiving an "INVITE" SIP message that requests the SIP session between the first and second SIP devices.

5. The method of claim 1, wherein dynamically opening a pinhole comprises:
parsing the SIP message to extract an IP address and port;
setting a private IP address/port pair of the pinhole to the extracted IP address and port; and
setting a public IP address/port pair of the pinhole to allow any IP address and port combination.

6. The method of claim 1, further comprising dynamically opening one or more additional pinholes, wherein the additional pinholes include one or more of a SIP pinhole, a Session Description Protocol (SDP)/Real-time Transport Protocol (RTP) pinhole, a signaling pinhole based on one or more of a VIA, a contact, and a record route header.

7. The method of claim 1, wherein assigning a set of resources includes:
parsing the SIP message to extract a call identifier (ID); and
associating the resources with the call ID.

8. The method of claim 7, wherein determining whether each of the calls has completed includes:
parsing the subsequent SIP message to extract SIP state information; and
determining that one of the calls has completed when the extracted SIP state information indicates that the subsequent SIP message is either a "BYE" SIP message or a "200 OK" message.

9. The method of claim 8,
wherein the call ID is a first call ID, and
wherein returning the set of resources includes:
parsing the subsequent SIP message to extract a second call ID;
determining whether the first call ID matches the second call ID; and
based on the determination that the first call ID matches the second call ID, returning the resources associated with the first call ID to the resource pool for future use by the network security device.

10. A network security device that secures a private network from attack by a public network, the network device comprising:
at least one processor that executes a resource manager module that manages a resource pool and a Session Initiation Protocol (SIP) module,
wherein the resource pool stores resources available for use by the network security device, and wherein the SIP module (i) receives a SIP message from a private server located in the private network, the SIP message requesting a SIP session between a private SIP device in the private network and a public SIP device in the public network, (ii) in response to the SIP message, dynamically opening a pinhole within the network security device, the pinhole allowing messages for a plurality of calls for the SIP session to concurrently flow through the network security device between the private and public devices, (iii) assigns via the resource manager module a set of the available resources included within the resource pool to monitor each call of the plurality of calls occurring over the SIP session, (iv) determines whether each of the calls has completed based on a session layer characteristic of a subsequent SIP message associated with each of the calls, and (v) based on the determination, returns via the resource manager module the set of available resources assigned to monitor each completed call to the resource pool for future use by the network security device.

11. The network security device of claim 10, wherein the network security device comprises a firewall.

12. The network security device of claim 10, wherein the SIP module further assigns one or more of a memory resource and a buffer resource included within the resource pool to monitor each of the calls occurring over the SIP session.

13. The network security device of claim 10, wherein the SIP module further receives an "INVITE" SIP message that requests the SIP session between the first and second SIP devices.

14. The network security device of claim 10, wherein the SIP module further parses the SIP message to extract an IP address and port, sets a private IP address/port pair of the pinhole to the extracted IP address and port, and sets a public IP address/port pair of the pinhole to allow any IP address and port combination.

15. The network security device of claim 10,
wherein the SIP module further dynamically opens one or more additional pinholes, and
wherein the additional pinholes include one or more of a SIP pinhole, a Session Description Protocol (SDP)/Real-time Transport Protocol (RTP) pinhole, and a signaling pinhole based on one or more of a VIA, a contact, and a record route header.

16. The network security device of claim 10, wherein the SIP module further parses the SIP message to extract a call identifier (ID) and associates the resources with the call ID.

17. The network security device of claim 16, wherein the SIP module further parses the subsequent SIP message to extract SIP state information and determines that one of the calls has completed when the extracted SIP state information indicates that the subsequent SIP message is either a "BYE" SIP message or a "200 OK" message.

18. The network security device of claim 17,
wherein the call ID is a first call ID, and
wherein the SIP module further parses parsing the subsequent SIP message to extract a second call ID, determines whether the first call ID matches the second call ID and, based on the determination that the first call ID matches the second call ID, returns the resources associated with the first call ID to the resource pool for future use by the network security device.

19. A non-transitory computer-readable medium comprising instructions for causing a programmable processor to:
receive a session initiation protocol (SIP) message with the network security device from a private server located in the private network, the SIP message requesting a SIP session between a private SIP device in the private network and a public SIP device in the public network;

in response to the SIP message, dynamically open a pinhole within the network security device, the pinhole allowing messages for a plurality of calls for the SIP session to concurrently flow through the network security device between the private and public devices;

assign a set of resources included within a resource pool of the network security device to monitor each call of the plurality of calls occurring over the SIP session, wherein the resource pool stores resources available for use by the network security device;

determine whether each of the calls has completed based on a session layer characteristic of a subsequent SIP message associated with each of the calls; and based on the determination, return the set of resources assigned to monitor each completed call to the resource pool for future use by the network security device.

20. The non-transitory computer-readable medium of claim 19, wherein the instructions cause the processor to receive the SIP message by receiving an "INVITE" SIP message that requests the SIP session between the first and second SIP devices.

21. The non-transitory computer-readable medium of claim 19, wherein the instructions cause the processor to dynamically open the pinhole by:

parsing the SIP message to extract an IP address and port;
setting a private IP address/port pair of the pinhole to the extracted IP address and port; and
setting a public IP address/port pair of the pinhole to allow any IP address and port combination.

22. The non-transitory computer-readable medium of claim 19, wherein the instructions cause the processor to assigning the set of resources by:

parsing the SIP message to extract a call identifier (ID); and
associating the resources with the call ID.

23. The non-transitory computer-readable medium of claim 22, wherein the instructions cause the processor to determine whether each of the calls has completed by:

parsing the subsequent SIP message to extract SIP state information; and
determining that one of the calls has completed when the extracted SIP state information indicates that the subsequent SIP message is either a "BYE" SIP message or a "200 OK" message.

24. The non-transitory computer-readable medium of claim 23, wherein the call ID is a first call ID, and
wherein the instructions cause the processor to return the set of resources by:
parsing the subsequent SIP message to extract a second call ID;
determining whether the first call ID matches the second call ID; and
based on the determination that the first call ID matches the second call ID, returning the resources associated with the first call ID to the resource pool for future use by the network security device.

* * * * *